United States Patent
Chandwani et al.

(10) Patent No.: US 10,341,983 B2
(45) Date of Patent: Jul. 2, 2019

(54) LOCATING CUSTOMER PREMISES EQUIPMENT IN A NARROW BEAMWIDTH BASED RADIO ACCESS NETWORK

(71) Applicant: Verizon Patent and Licensing Inc., Arlington, VA (US)

(72) Inventors: Rakesh Chandwani, Morganville, NJ (US); Frank Jager, Chester, NJ (US); Ratul Kumar Guha, Kendall Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/939,888

(22) Filed: Mar. 29, 2018

(65) Prior Publication Data

US 2018/0227879 A1  Aug. 9, 2018

Related U.S. Application Data

(62) Division of application No. 15/233,249, filed on Aug. 10, 2016, now Pat. No. 9,961,664.

(51) Int. Cl.
*H04W 64/00* (2009.01)
*H04W 76/10* (2018.01)
*H04W 24/08* (2009.01)
*H04W 16/28* (2009.01)

(52) U.S. Cl.
CPC ......... *H04W 64/003* (2013.01); *H04W 24/08* (2013.01); *H04W 76/10* (2018.02); *H04W 16/28* (2013.01)

(58) Field of Classification Search
CPC .... H04B 7/0617; H04B 7/024; H04B 7/0413; H04B 7/0632; H04B 7/0695; H04B 7/0452; H04B 7/0456; H04B 7/0639; H04B 7/0417; H04B 7/0408; H04B 7/0619; H04B 7/086; H04B 7/0634; H04B 7/088; H04B 7/01; H04W 64/003; H04W 72/04; H04W 84/12; H04W 72/042; H04W 28/20; H04W 74/006; H04W 84/045; H04W 24/06; H04W 28/08
USPC ..... 455/450, 509, 561, 562.1, 522, 63.1, 77; 375/267, 241, 146, 295, E1.032, 144, 375/147, 148, 219
See application file for complete search history.

(56) References Cited

U.S. PATENT DOCUMENTS

| | | |
|---|---|---|
| 2004/0203889 A1 | 10/2004 | Karaoguz |
| 2010/0081448 A1 | 4/2010 | Wong |
| 2011/0211487 A1 | 9/2011 | Han |

(Continued)

OTHER PUBLICATIONS

Downlink BeamForming for Cellular Mobile communications, by Javier Fonollosa, Tel Aviv University, Tel Aviv, Dec. 2015.*

(Continued)

*Primary Examiner* — Fred A Casca

(57) ABSTRACT

A device may receive, from a base station, a wireless signal. The device may determine, based on the wireless signal, at least one of a signal quality value associated with the wireless signal or information indicative of a location of the base station relative to the device. The device may output a positioning notification, indicative of a manner in which the device is to be positioned, based on at least one of the signal quality value or the information indicative of the location of the base station.

20 Claims, 13 Drawing Sheets

(56) References Cited

U.S. PATENT DOCUMENTS

| | | | | |
|---|---|---|---|---|
| 2012/0184261 A1* | 7/2012 | Tamura | ............. | H04W 52/0258 |
| | | | | 455/418 |
| 2012/0328034 A1* | 12/2012 | Nabar | .................. | H04B 7/0617 |
| | | | | 375/260 |
| 2013/0321207 A1* | 12/2013 | Monogioudis | ......... | H01Q 1/246 |
| | | | | 342/373 |
| 2015/0189619 A1 | 7/2015 | Kalliola | | |
| 2015/0323642 A1 | 11/2015 | Mutz | | |
| 2015/0372795 A1* | 12/2015 | Wu | ....................... | H04L 5/0057 |
| | | | | 370/329 |
| 2016/0198474 A1* | 7/2016 | Raghavan | ......... | H04W 72/0466 |
| | | | | 370/335 |
| 2016/0226647 A1 | 8/2016 | Wang | | |
| 2016/0302125 A1 | 10/2016 | Tejedor | | |
| 2016/0370450 A1 | 12/2016 | Thorn | | |
| 2017/0059688 A1* | 3/2017 | Gan | ........................ | G01S 3/325 |
| 2018/0062719 A1* | 3/2018 | Verma | ................. | H04B 7/0617 |

OTHER PUBLICATIONS

Antenna Theory, third Edition, by Constantine Balanis, (Chapter 16), 2004,, ISBN:978-1-1-118-642060-1.*
CWNA Certified Wireless Network Administrator Official Deluxe Study Guide, ISBN: 13:978-1-119-06776-4, 2015.*
Wireless Communications, by Andrea Goldsmith, (Chapter 10), 2005, ISBN-13:978-0-521-83716-3.*

* cited by examiner

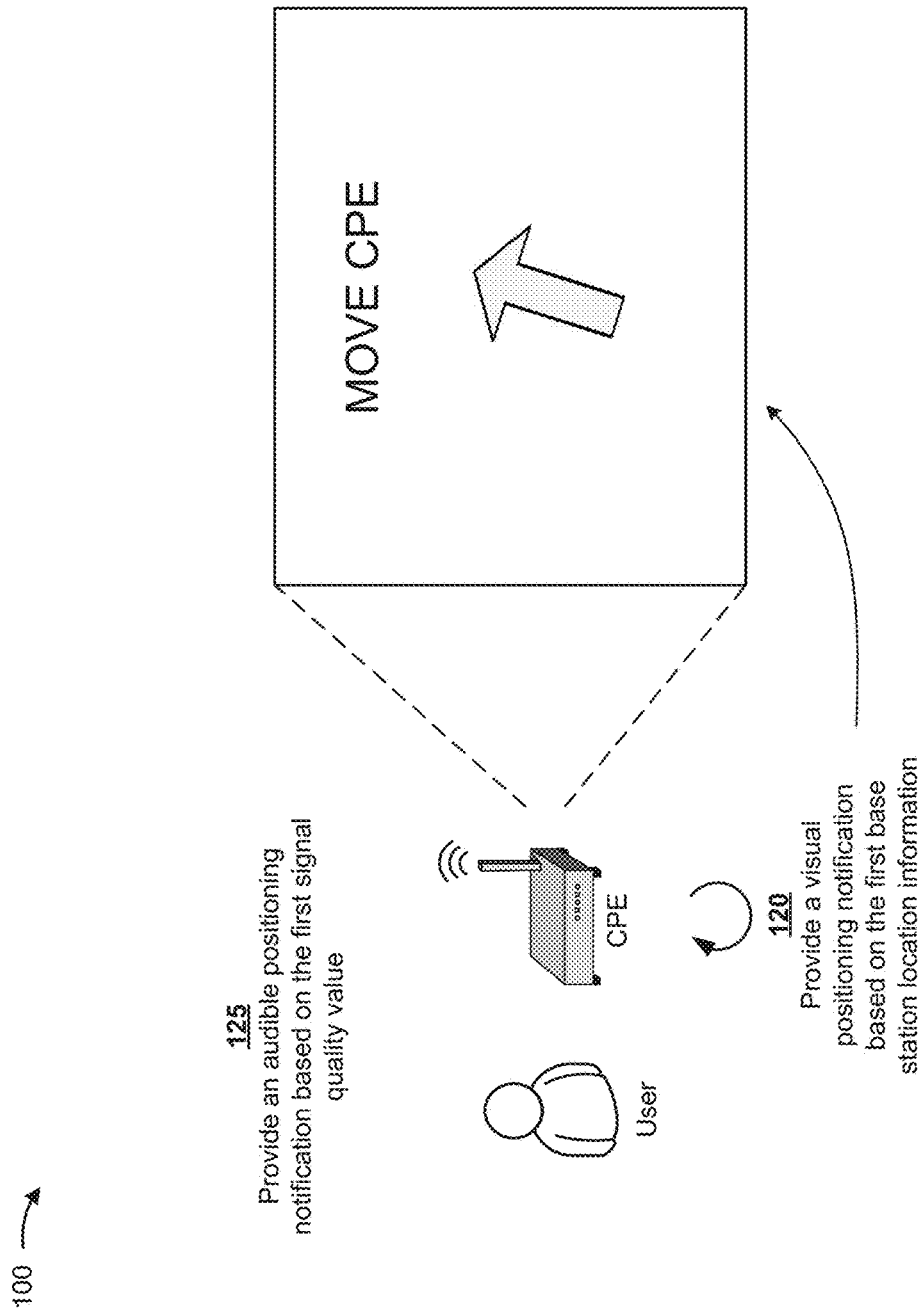

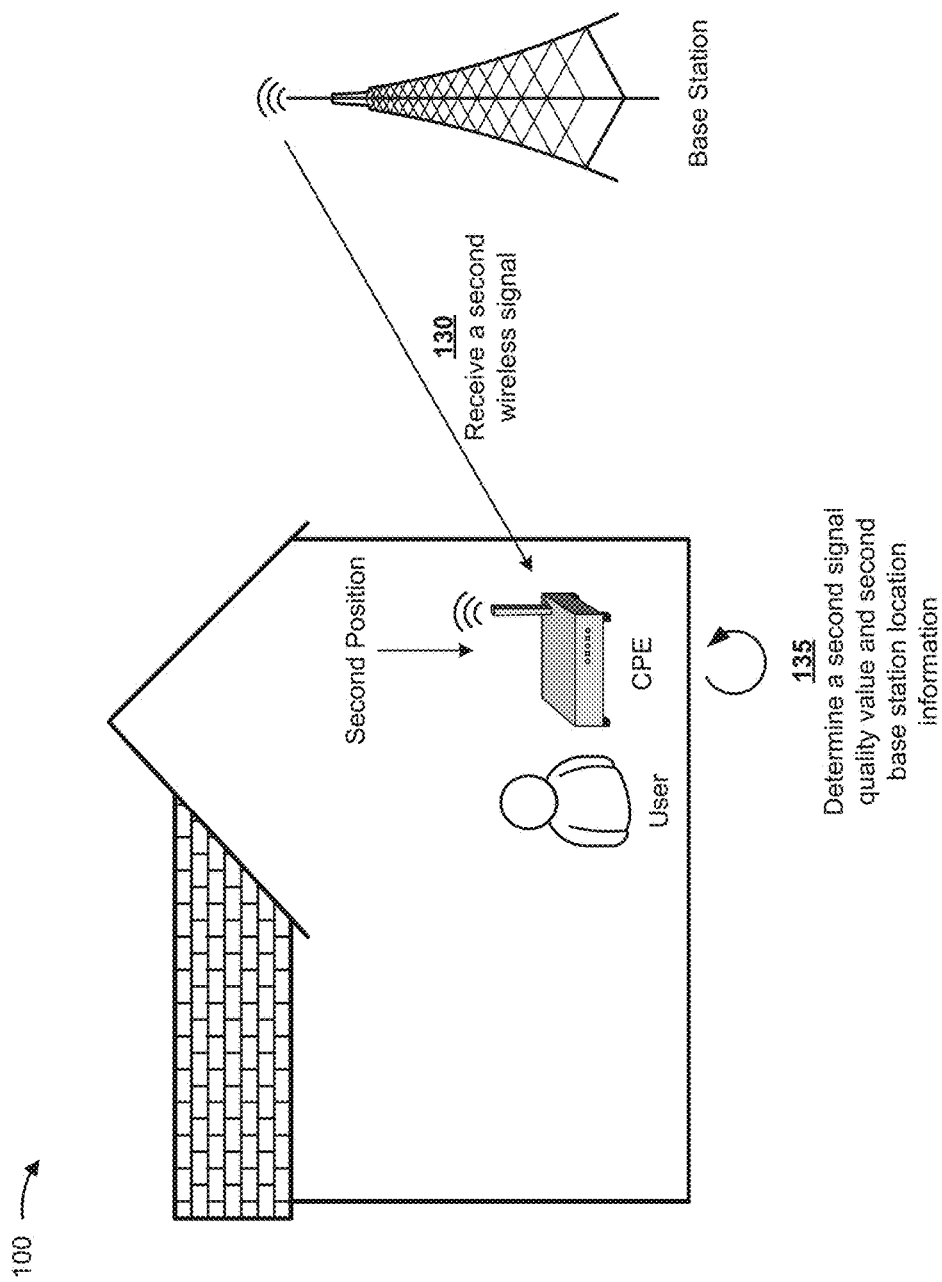

LOCATING CUSTOMER PREMISES EQUIPMENT IN A NARROW BEAMWIDTH BASED RADIO ACCESS NETWORK

RELATED APPLICATION

This application is a divisional of U.S. patent application Ser. No. 15/233,249, filed Aug. 10, 2016, which is incorporated herein by reference.

BACKGROUND

Base stations emit radio frequency (RF) signals that may be received by customer premises equipment (CPE) for communication. The RF signals may be received with different power. The power with which the RF signals are received may affect a quality of communication with the base station.

BRIEF DESCRIPTION OF THE DRAWINGS

FIGS. 1A-1H are diagrams of an overview of an example implementation described herein;

DETAILED DESCRIPTION OF PREFERRED EMBODIMENTS

Figure 1A:
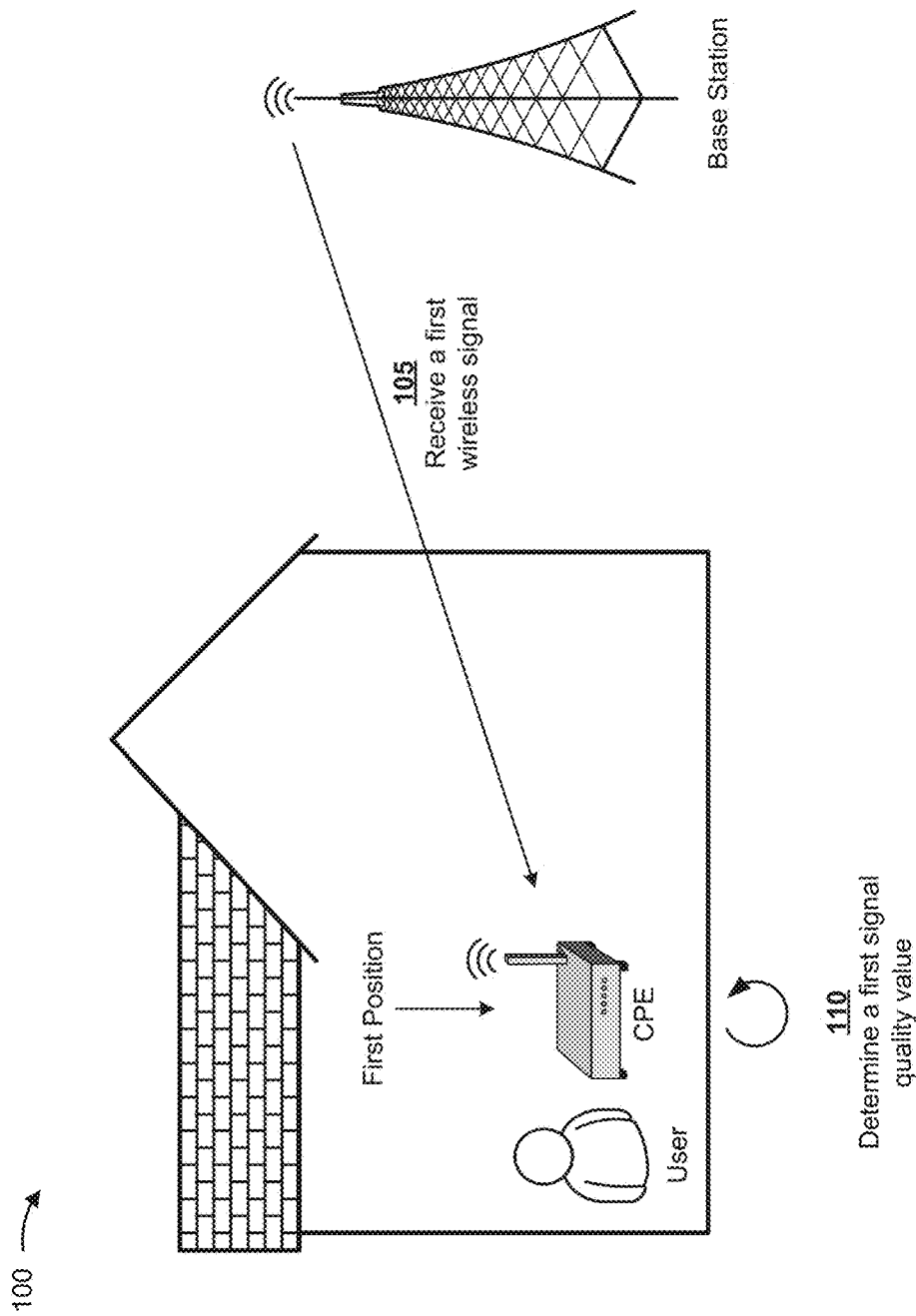

The following detailed description of example implementations refers to the accompanying drawings. The same reference numbers in different drawings may identify the same or similar elements.

In order to enable increased bandwidth, higher throughput, and more efficient spectrum usage in association with broadband services, wireless networks, such as for example, Fifth Generation (5G) radio access networks (RANs) may operate using high frequency spectrum bands, such as frequency bands between 30 and 300 GHz (e.g., "millimeter wave" bands). RF signals associated with such high frequency bands may be susceptible to RF environment issues, such as increased free-space propagation losses, diffraction losses, and/or penetration losses.

To mitigate the RF environment issues, a base station may implement multiple-input multiple-output (MIMO) techniques such as beamforming and/or beam steering techniques to increase received signal strength at customer premises equipment (CPE), such as a wireless router. Further, the small wavelengths associated with the high frequency spectrum bands (e.g., "millimeter wave" bands) may allow the implementation of more antenna elements per antenna, thereby facilitating the usage of such techniques and thereby enabling narrow directional beams that may transmit increased energy to the CPE. In light of the narrow directional beams, strategic placement of the CPE in association with a customer's premises becomes an increasingly important task (e.g., to improve or optimize received signal strength, etc.).

Implementations described herein enable CPE to receive wireless signals from a base station and determine, based on the wireless signals, signal quality values and/or base station location information (e.g., information indicative of a location of the base station relative to the CPE). Additionally, implementations described herein enable the CPE to output a positioning notification, indicative of a manner in which the CPE is to be positioned, based on the signal quality values and/or the information indicative of the location of the base station relative to the CPE.

For example, the CPE may provide visual and/or audible positioning notifications based on the signal quality values and/or the base station location information (e.g., via an output component, such as a display screen and/or a speaker) in order to provide an indication of a viability of a position at which to place and/or orient the CPE. In this way, a user may identify a particular position (e.g., a location and/or orientation) of the CPE that improves or optimizes received signal strength, and may install the CPE in association with the particular position.

Additionally, implementations described herein enable the CPE to establish a data connection with a base station, determine network metric values (e.g., bandwidth values), and provide messages that identify the network metric values to the base station. Additionally, implementations described herein enable the base station to perform a technique (e.g., a beam steering technique) to direct a main lobe of a radiation pattern towards the CPE based on the network metric values. Additionally, implementations described herein enable the base station to determine that a network metric value satisfies a threshold, and perform a technique (e.g., a beamforming technique) to narrow a main lobe of the radiation pattern to direct radiated power towards the CPE.

In this way, implementations described herein enable a user to determine a particular position, at which to install a CPE, that improves or maximizes bandwidth and throughput without the aid of a network operator. Additionally, implementations described herein enable a CPE and a base station to reduce communication issues (e.g., low data throughput, radio link failure, or the like), thereby conserving processor and/or memory resources of the CPE and/or base station, and thereby conserving network resources.

FIGS. 1A-1H are diagrams of an overview of an example implementation 100 described herein. As shown in FIG. 1A, example implementation 100 may include a premises within which a CPE (located at a first position) and a user are located, and may further include a base station capable of communication with the CPE. As shown by reference number 105, the CPE may receive a first wireless signal (e.g., a reference signal) from the base station. As shown by reference number 110, the CPE may determine a first signal quality value associated with the wireless signal (e.g., signal strength, power, or the like).

Figure 1B:
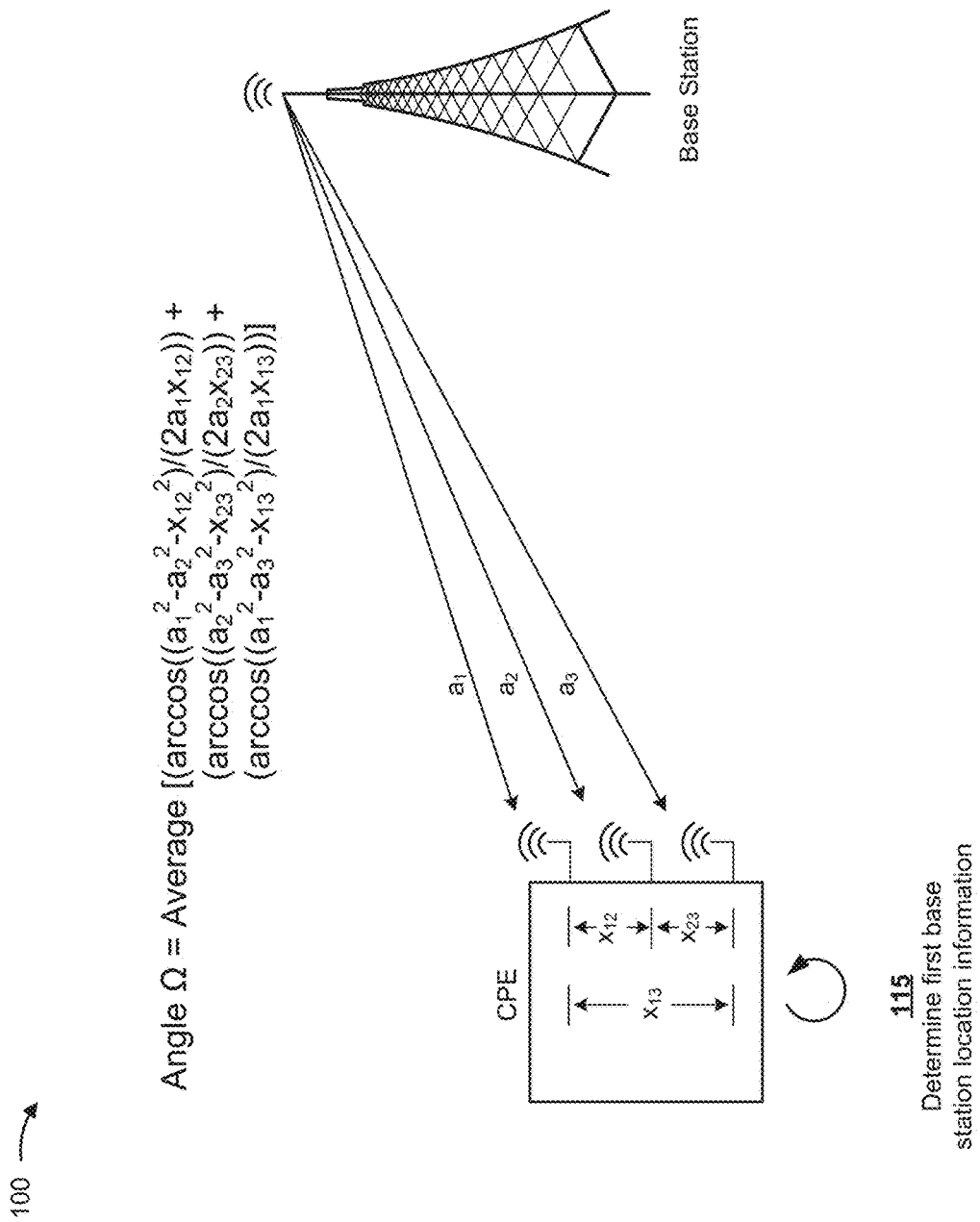

As shown in FIG. 1B, and by reference number 115, the CPE may determine first base station location information. For example, the first base station location information may refer to information that is indicative of a location of the base station in relation to the CPE. As shown, the CPE may receive a wireless signal (or wireless signals) via multiple antenna elements. Additionally, the CPE may determine values (e.g., path loss values, signal quality values, or the like) that correspond to each respective antenna element (e.g., measured by a respective antenna element). For example, as shown, the CPE may determine a first value ("$a_1$") that corresponds to a first antenna element, a second value ("$a_2$") that corresponds to a second antenna element, and a third value ("$a_3$") that corresponds to a third antenna element.

As further shown in FIG. 1B, the CPE may determine multiple angles of arrival using different antenna element pairs. For example, as shown, the CPE may determine a first angle of arrival based on a first antenna element pair (e.g., antenna element one and antenna element two). For example, as shown, the CPE may determine a first angle of arrival using an inverse cosine function, the first value ("$a_1$"), the second value ("$a_2$"), and a distance ("$x_{12}$") between the first antenna element and the second antenna element. As shown, the CPE may determine a second angle of arrival value (e.g., based on the second antenna element and the third antenna element), and a third angle of arrival value (e.g., based on the first antenna element and the third antenna element) in a similar manner as described above in connection with the first angle of arrival value. As further shown in FIG. 1B, the CPE may determine an overall angle of arrival value, shown as omega ("$\Omega$"), based on performing a mathematical operation (e.g., averaging) using the first, second, and third angle of arrival values.

As shown in FIG. 1C, the CPE may provide one or more positioning notifications to aid the user in positioning the CPE. As shown by reference number 120, the CPE may provide a visual positioning notification based on the first base station location information. For example, the CPE may provide a visual positioning notification (e.g., via a display screen, lights or LEDs), such as visual indicator that points in the direction of the base station, accompanied by text (e.g., "Move CPE"). As an example, the CPE may provide the visual positioning notification to include an indicator that points in a direction based on the overall angle of arrival value (e.g., "$\Omega$"). For example, the CPE may provide the visual positioning notification to include the indicator that points in a direction based on the overall angle of arrival value in relation to the second antenna element (e.g., the center antenna element). Additionally, or alternatively, as shown by reference number 125, the CPE may provide an audible positioning notification based on the first signal quality value or the first base station location information. For example, the CPE may provide an audible positioning notification such as a sequence of sounds occurring at a temporal frequency that is based on the first signal quality value. As an example, the audible positioning notification may assist the user in identifying a viability of the first position as a position at which to place the CPE (e.g., based on the temporal frequency). Based on the one or more positioning notifications, the user may reposition the CPE to a second position. For example, the user may move the CPE in a direction indicated by the visual positioning notification. Additionally, assume that the audible positioning notification includes a particular temporal frequency that indicates that the first signal quality value may be improved based on moving the CPE to the second position (e.g., the audible positioning notification may include an extended pause between sounds). In this case, the user may reposition the CPE based on the audible positioning notification. Additionally, and/or alternatively, the audible positioning notification may provide verbal instructions to assist the user in locating the CPE.

As shown in FIG. 1D, and by reference number 130, the CPE may receive a second wireless signal after being moved to a second position. As shown by reference number 135, the CPE may determine a second signal quality value and/or second base station location information associated with the location of the base station (e.g., in relation to the new location of the CPE).

Figure 1E:
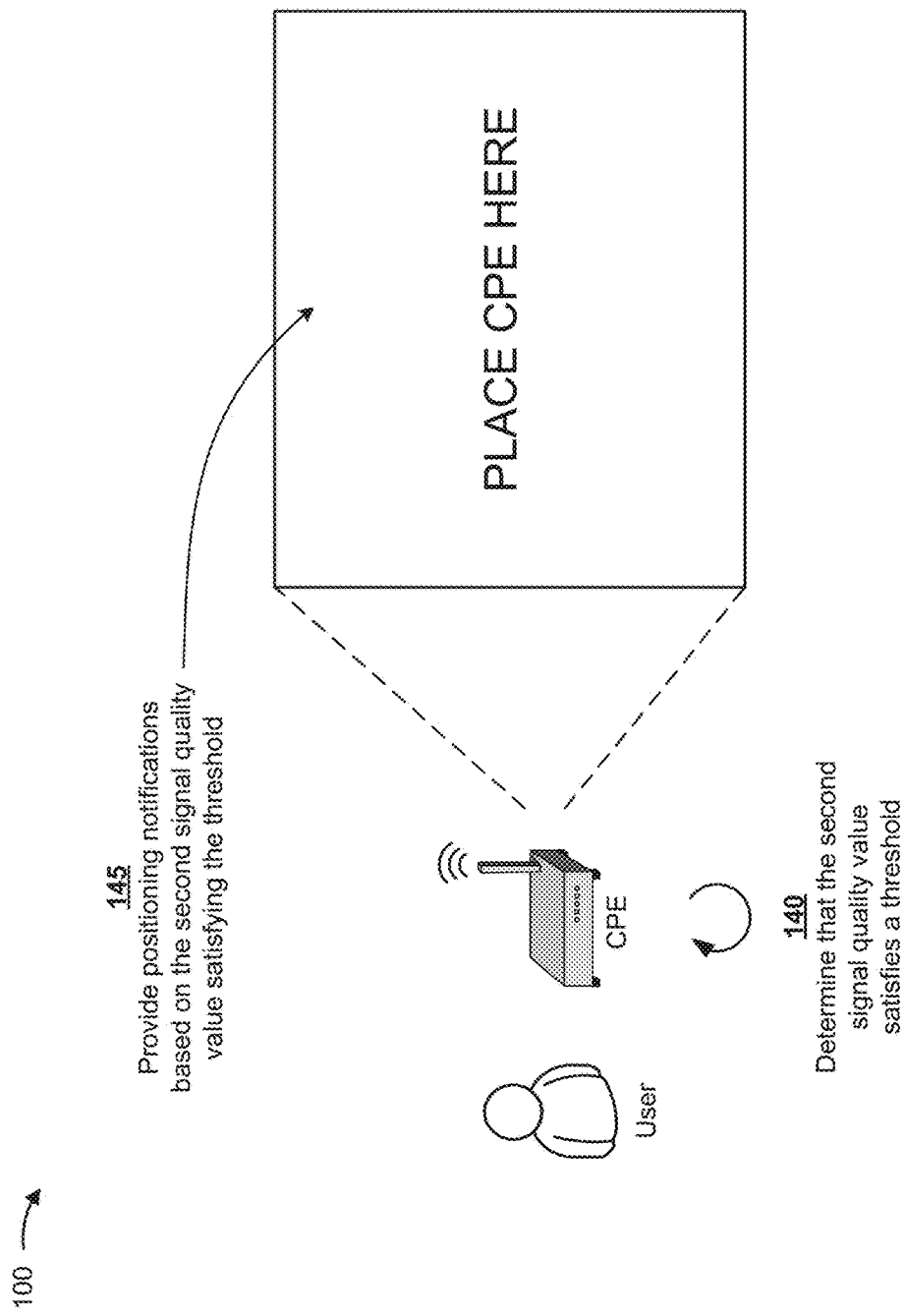

As shown in FIG. 1E, the CPE may provide one or more positioning notifications to aid the user in determining that the CPE is positioned in an improved position. As shown by reference number 140, the CPE may determine that the second signal quality value satisfies a threshold (e.g., a maximum signal quality value). As shown by reference number 145, and based on the second signal quality value satisfying the threshold, the CPE may provide one or more positioning notifications indicating to the user that the second position of the CPE is associated with an improved signal quality as compared to the first position and/or is associated with a particularly viable position. For example, the CPE may provide an audible positioning notification, such as a long continuous tone, or such as a sequence of sounds occurring at a higher temporal frequency than when the CPE was associated with the first position. As another example, the CPE may provide a visual positioning notification indicating that the CPE is in an improved position, such as by displaying text (e.g., "PLACE CPE HERE") or flashing or steady state LEDs.

Figure 1F:
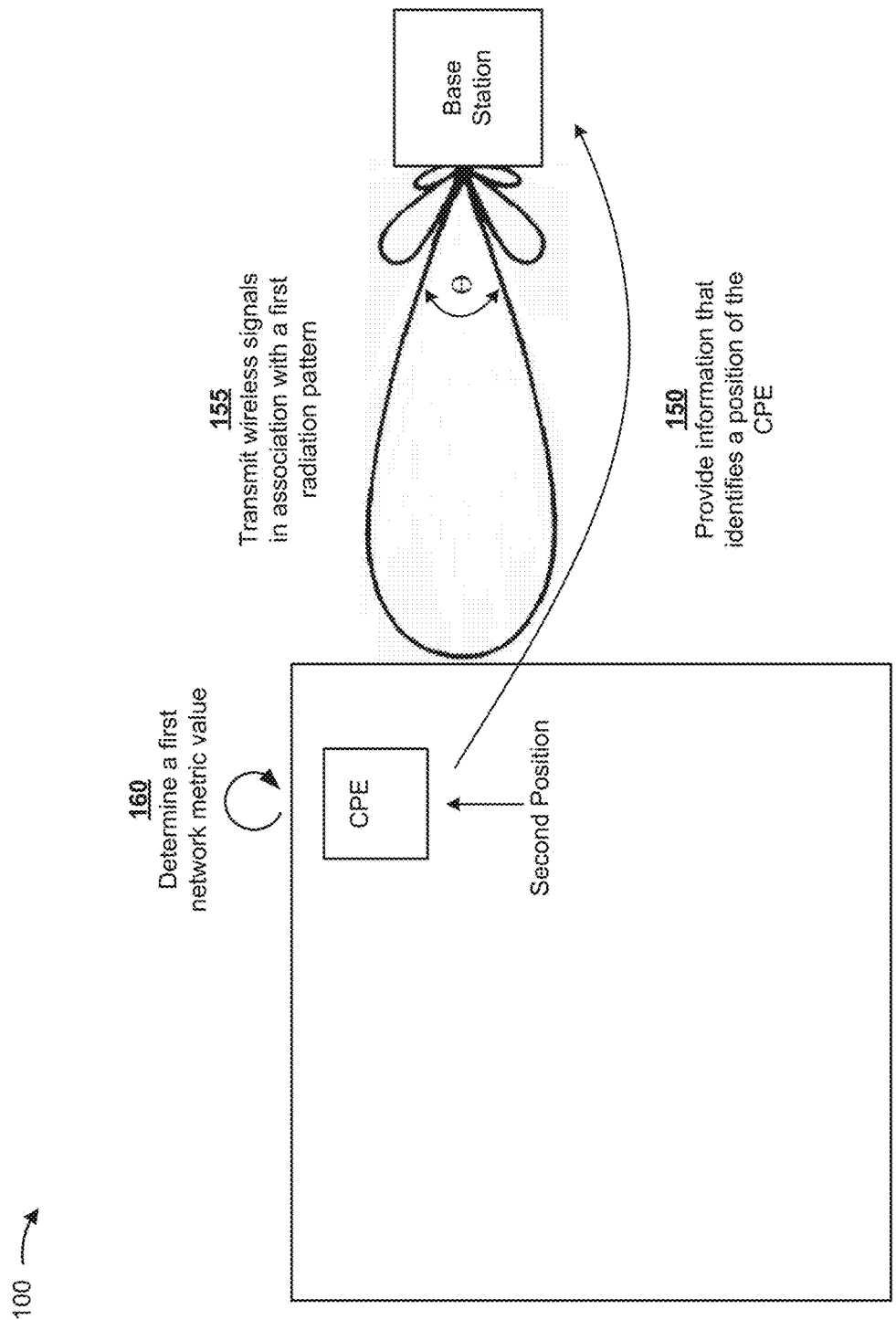
Figure 1G:
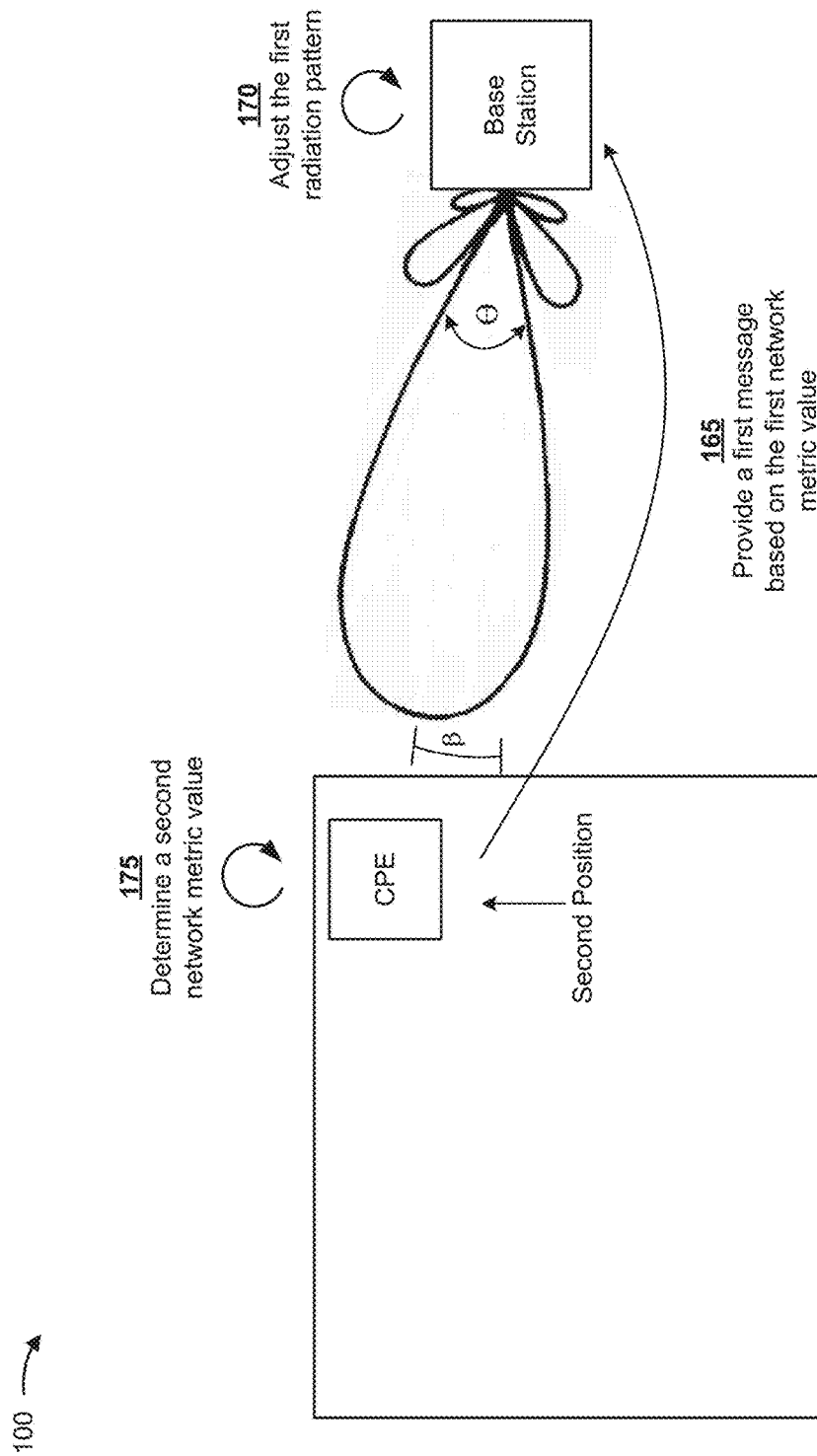
Figure 1H:
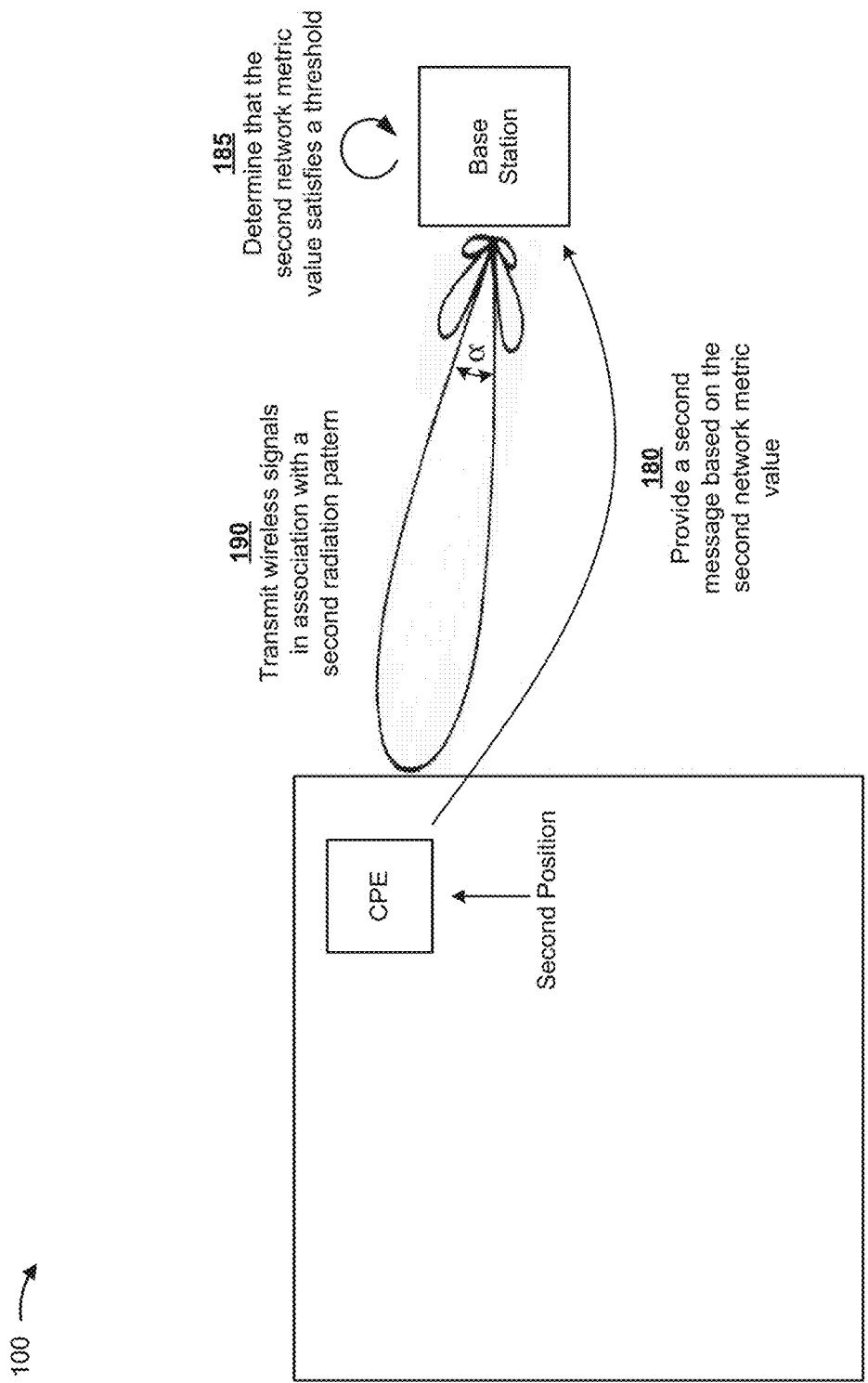

FIGS. 1F-1H show an overhead view (e.g., a "birds-eye" view) of the base station and the customer premises, and depict the CPE as being located in the second position (as described above). As shown in FIG. 1F, and by reference number 150, the CPE may provide, such as via a wireless signal (e.g., a pilot signal), information that identifies a position of the CPE (e.g., global positioning system (GPS) coordinates, a device identifier, or the like). As shown by reference number 155, the base station may transmit wireless signals in association with a first radiation pattern. For example, the radiation pattern may include a main lobe associated with a first beamwidth, such as may be defined by an azimuth angle, shown as theta (e.g., $\theta=10$ degrees). As shown by reference number 160, the CPE may determine a first network metric value based on a data connection with the base station (e.g., a bandwidth value, a throughput value, a goodput value, or the like).

As shown in FIG. 1G, and by reference number 165, the CPE may provide a first message, based on the first network metric value, to the base station. As shown by reference number 170, the base station may adjust the first radiation pattern based on the first message. For example, the base station may perform a beam steering technique to adjust the direction of the main lobe by an azimuth angle beta (e.g., $\beta=2$ degrees). For example, the base station may identify the first network metric value, and may perform the beam steering technique to increase additional network metric values (e.g., increase bandwidth values, or the like). As shown by reference number 175, the CPE may determine a second network metric value (e.g., in a manner similar to determining the first network metric value, described above).

As shown in FIG. 1H, and as shown by reference number 180, the CPE may provide, to the base station, a second message based on the second network metric value (e.g., in a manner similar to providing the first message, as described above). As shown by reference number 185, the base station may determine that the second network metric value satisfies a threshold. Based on the second network metric value satisfying the threshold, the base station may determine that the main lobe is directed towards the CPE, such that the CPE is receiving signals in an improved manner (e.g., improving RF link quality, or the like). As shown by reference number 190, the base station may transmit wireless signals in association with a second radiation pattern. For example, the base station may perform a beamforming technique to narrow the main lobe to a reduced beamwidth (e.g., an azimuth angle alpha ("α") that is smaller than theta ("θ")). The base station may thereafter continue to transmit an improved, narrow beamwidth signal towards the CPE.

In this way, the base station may direct wireless signals to the CPE using a narrow beam, thereby increasing antenna gain, improving link performance, mitigating RF environment issues, or the like. Furthermore, the base station may conserve processor and/or memory resources and/or network resources by reducing communication issues (e.g., low data throughput, radio link failure, radio resource control drop, etc.). Additionally, the user may identify an improved position at which to install the CPE without the aid of a network operator (e.g., based on audible and/or visual positioning notifications provided via the CPE), which may improve usage of network resources.

As indicated above, FIGS. 1A-1H are provided merely as an example. Other examples are possible and may differ from what was described with regard to FIGS. 1A-1H.

Figure 2:
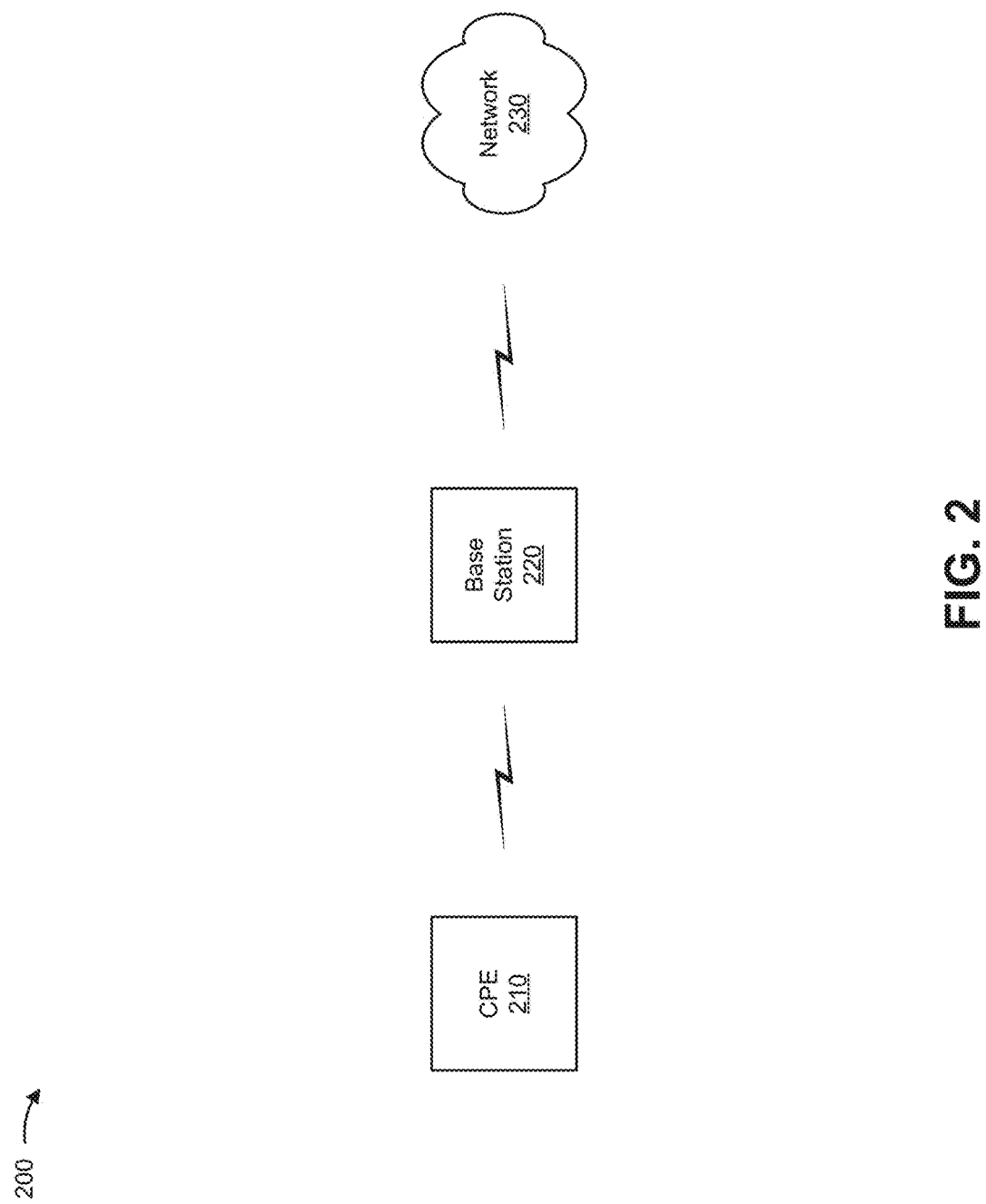
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a CPE 210, a base station 220, and a network 230. Devices of environment 200 may interconnect via wired connections, wireless connections, or a combination of wired and wireless connections.

CPE 210 includes one or more devices capable of connecting to network 230 via base station 220. For example, CPE 210 may include a wireless communication device, such as a router, a gateway, a switch, a set-top box (STB), a television, a computer (e.g., a tablet computer, a laptop computer, etc.), a mobile phone, a wireless hot spot, a gaming device, a smart device (e.g., an Internet of Things (IoT) device, a machine-type communication device, a machine-to-machine communication device, etc.), or a similar type of device. In some implementations, CPE 210 may provide network access (e.g., Internet access, service access, etc.) to devices associated with a premises (e.g., a customer's premises). In some implementations, CPE 210 may transmit information to and/or receive information from base station 220. In some implementations, CPE 210 may provide positioning notifications (e.g., via an output component) based on wireless signals received from base station 220 (e.g., based on signal quality values, base station location information, or the like). Additionally, CPE 210 may provide, to base station 220, information that identifies network metric values (e.g., bandwidth values, throughput values, etc.).

Base station 220 includes one or more devices capable of communicating with CPE 210 using a cellular radio access technology. For example, base station 220 may include a base transceiver station, a radio base station, a node B, an evolved node B (eNB), a base station subsystem, a cellular site, a cellular tower (e.g., a cell phone tower, a mobile phone tower, etc.), a radio access node, a macrocell base station, a microcell base station, a picocell base station, a femtocell base station, or a similar type of device. Base station 220 may transfer traffic between CPE 210 and network 230. In some implementations, base station 220 may communicate with CPE 210 (and/or one or more other devices) using radio waves (e.g., via an air interface). In some implementations, base station 220 may include several antenna elements that can be used individually or combined to synthesize several overlapping antenna beams spanning three-hundred and sixty (360) degrees in azimuth. In some implementations, base station 220 may operate in an ultra high frequency (UHF) band (e.g., 300-3000 MHz), a super high frequency (SHF) band (e.g., 3-30 GHz), an extremely high frequency (EHF) band (e.g., 30-300 GHz), or the like.

While implementations herein may be described in the context of broadband services provided via 5G technologies, other wireless protocols may be used. For example, components conforming to 5G standards described herein may be replaced by components conforming to other network protocols (e.g., long-term evolution (LTE), Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Network 230 includes one or more wired and/or wireless networks. For example, network 230 may include a cellular network (e.g., a 5G network, an LTE network, a third generation (3G) network, a CDMA network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, network 230 may include core network equipment, such as a packet data network (PDN) gateway (PGW), a serving gateway (SGW), a mobility management entity (MME), or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
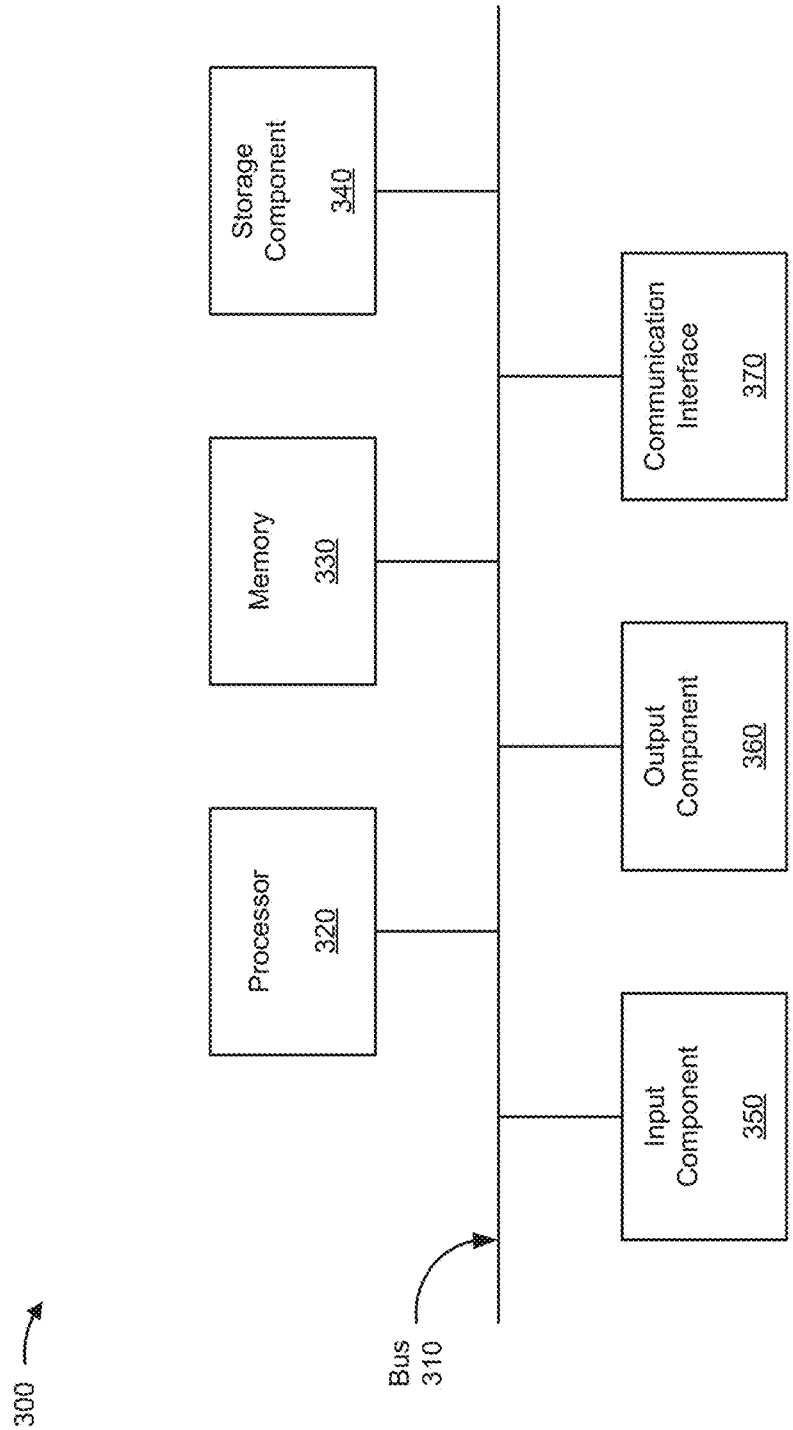
FIG. 3 is a diagram of example components of one or more devices of FIG. 2.

FIG. 3 is a diagram of example components of a device 300. Device 300 may correspond to CPE 210 and/or base station 220. In some implementations, CPE 210 and/or base station 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a GPS component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
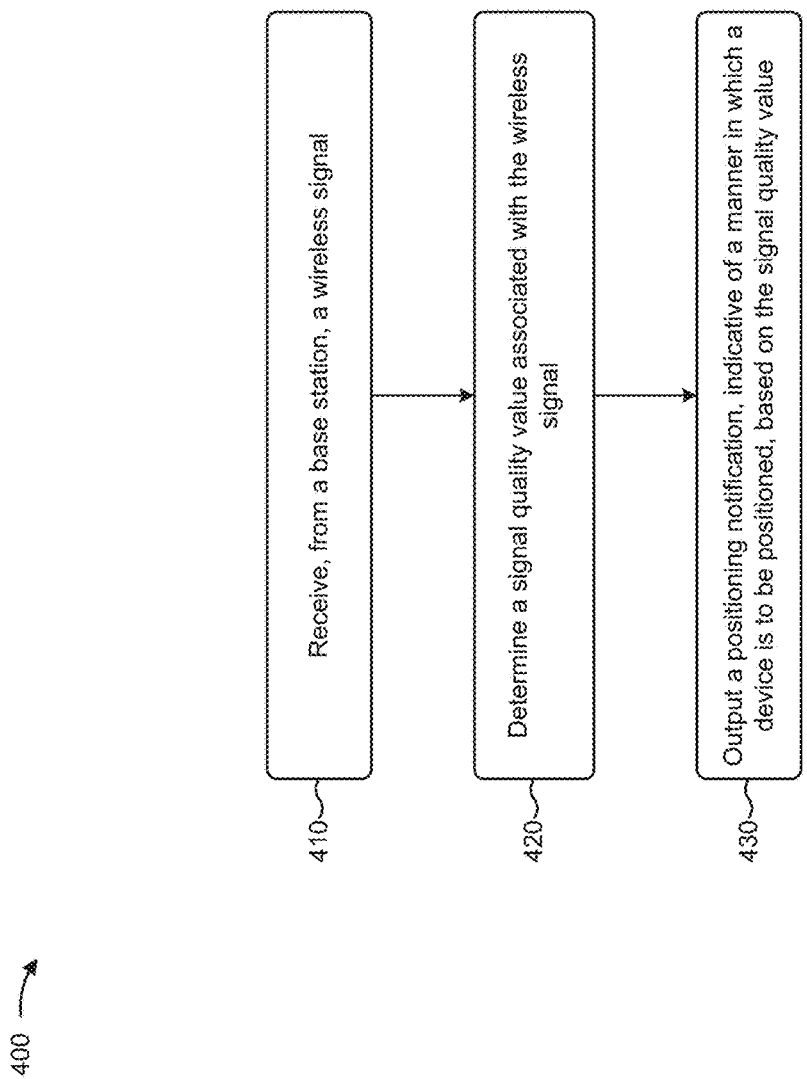
FIG. 4 is a flow chart of an example process for providing a positioning notification based on a signal quality value.

FIG. 4 is a flow chart of an example process 400 for providing a positioning notification based on a signal quality value. In some implementations, one or more process blocks of FIG. 4 may be performed by CPE 210. In some implementations, one or more process blocks of FIG. 4 may be performed by another device or a group of devices separate from or including CPE 210, such as base station 220.

As shown in FIG. 4, process 400 may include receiving, from a base station, a wireless signal (block 410), and determining a signal quality value associated with the wireless signal (block 420). For example, CPE 210 may measure a wireless signal, received via an antenna of CPE 210, to determine a signal quality value. In some implementations, CPE 210 may include multiple antennas. Additionally, or alternatively, CPE 210 may include a phased array antenna. For example, one or more antennas of CPE 210 may include multiple antenna elements (e.g., driven or active elements). In some implementations, CPE 210 may receive wireless signals from base station 220. For example, the wireless signals may include reference signals (e.g., a cell-specific reference signal (CRS), or the like).

In some implementations, CPE 210 may measure a signal quality parameter associated with a wireless signal. For example, the signal quality parameter may represent a reference signal received power (RSRP), a received signal code power (RSCP), a received signal strength indicator (RSSI), a reference signal received quality (RSRQ), a block error rate (BLER), a signal-to-interference-plus-noise ratio (SINR), a path loss (e.g., a downlink path loss), or the like. In some implementations, the signal quality parameter may be represented using a signal quality value, such as a decibel value (e.g., an RSRP value, an RSSI value, a SINR value, or the like).

In some implementations, CPE 210 may be associated with a particular position when CPE 210 determines the signal quality value. For example, the position may include a geographic location (e.g., associated with latitude, longitude, and/or elevation coordinates). Additionally, or alternatively, the position may be associated with a particular orientation of CPE 210 (e.g., an orientation of CPE 210 in relation to base station 220). Additionally, or alternatively, the position may be associated with a customer premises (e.g., a home, an office, a business, or the like). For example, the position may be associated with a particular location in relation to a customer premises.

As further shown in FIG. 4, process 400 may include outputting a positioning notification, indicative of a manner in which a device is to be positioned, based on the signal quality value (block 430). For example, CPE 210 may provide a positioning notification (e.g., via an output component of CPE 210, such as a speaker, a display screen, an LED, or the like) based on the signal quality value. In some implementations, the positioning notification may indicate signal quality values of wireless signals received from base station 220, and/or may indicate a viability of a particular position at which to place CPE 210 (e.g., install CPE 210, such that signal quality values are maximized or improved, path loss is minimized or reduced, penetration loss is minimized or reduced, or the like).

In some implementations, the positioning notification may be indicative of a manner in which CPE 210 is to be positioned. For example, the positioning notification may identify a viability of a position (e.g., a current location and/or orientation) of CPE 210 as a position at which to place CPE 210 (e.g., whether CPE 210 should be installed at the current location, whether CPE 210 should be moved to another location and/or repositioned, or the like). For example, a user may identify whether to place CPE 210 at a particular position based on the positioning notification.

In some implementations, the positioning notification may include an audible positioning notification. For example, CPE 210 may provide an audible positioning notification based on the signal quality value (e.g., a sound, a sequence of sounds, a verbal command, or the like). Additionally, or alternatively, the positioning notification may include a visual positioning notification. For example, CPE 210 may provide information for display that identifies the signal quality value, that identifies a designation of the signal quality value (e.g., high, medium, low, green, yellow, red, or the like), information that identifies whether a signal quality is improved (e.g., as compared to a previous signal quality value), or the like.

In some implementations, the positioning notification may be provided at a temporal frequency based on the signal quality value. For example, the positioning notification may be associated with a particular temporal frequency based on the signal quality value. As an example, CPE 210 may provide a sequence of sounds (e.g., beeps) where each sound, associated with the sequence, occurs at a particular temporal interval. As another example, an LED associated with CPE 210 may emit light at a particular temporal frequency based on the signal quality value. Additionally, or alternatively, the positioning notification may be provided at a particular intensity based on the signal quality value. For example, the positioning notification may be provided at a particular volume level, a particular brightness level, or the like.

In some implementations, CPE 210 may provide the positioning notification at the particular temporal frequency and/or intensity based on the signal quality value. For example, CPE 210 may compare the signal quality value and a stored signal quality value (e.g., stored information that identifies signal quality values, such as a range of signal quality values, a maximum signal quality value, a minimum signal quality value, or the like), and may determine whether the signal quality value is associated with a particular range of signal quality values, satisfies a threshold, or the like. In some implementations, CPE 210 may be configured with the stored information, and/or may receive the stored information from another device (e.g., base station 220).

Additionally, CPE 210 may provide the positioning notification at a particular temporal frequency and/or intensity based on comparing the signal quality value and the stored signal quality value(s). For example, CPE 210 may determine that the signal quality value is associated with a particular range of signal quality values, satisfies a particular threshold, or the like. As a particular example, assume that CPE 210 determines that the signal quality value is associated with a range of signal quality values (e.g., a range including −95 to −90 dBM), which indicates that a higher (e.g., improved) signal quality value is possible. In this case, CPE 210 may provide the positioning notification at a particular temporal frequency and/or intensity based on the signal quality value being associated with the range (e.g., at a low volume level, or at a temporal frequency that includes an extended time interval between positioning notifications, or the like).

In some implementations, CPE 210 may determine that a signal quality value satisfies a threshold, and may provide a positioning notification that identifies that the signal quality value satisfies the threshold. For example, CPE 210 may provide an audible positioning notification (e.g., a sustained sound, or the like). As another example, CPE 210 may provide a visual positioning notification that identifies that the signal quality value satisfies the threshold. In this way, CPE 210 may notify a user that a position associated with CPE 210 is improved and/or is associated with a particular viability as a location for placement (e.g., is associated with a maximum signal quality, a minimum path loss, a minimum penetration loss, or the like).

Additionally, or alternatively, CPE 210 may provide the positioning notification based on comparing a first signal quality value and a second signal quality value. As an example, assume that CPE 210 determines a first signal quality value in association with a first position, and determines a second signal quality value in association with a second position. For example, assume that a user moves CPE 210 from the first position to the second position. Further, assume that the second signal quality value is improved (e.g., RSRP value=−80 dBM), as compared to the first signal quality value (RSRP value=−90 dBm). In this case, CPE 210 may provide a positioning notification at an increased temporal frequency (e.g., may reduce an interval between sounds associated with the positioning notification), at an increased intensity, or the like.

In this way, CPE 210 may provide the positioning notification, which may inform the user of the viability of a particular position as a location at which to place and/or orient CPE 210 (e.g., to minimize path loss, to minimize penetration loss, to maximize received signal strength, or the like).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
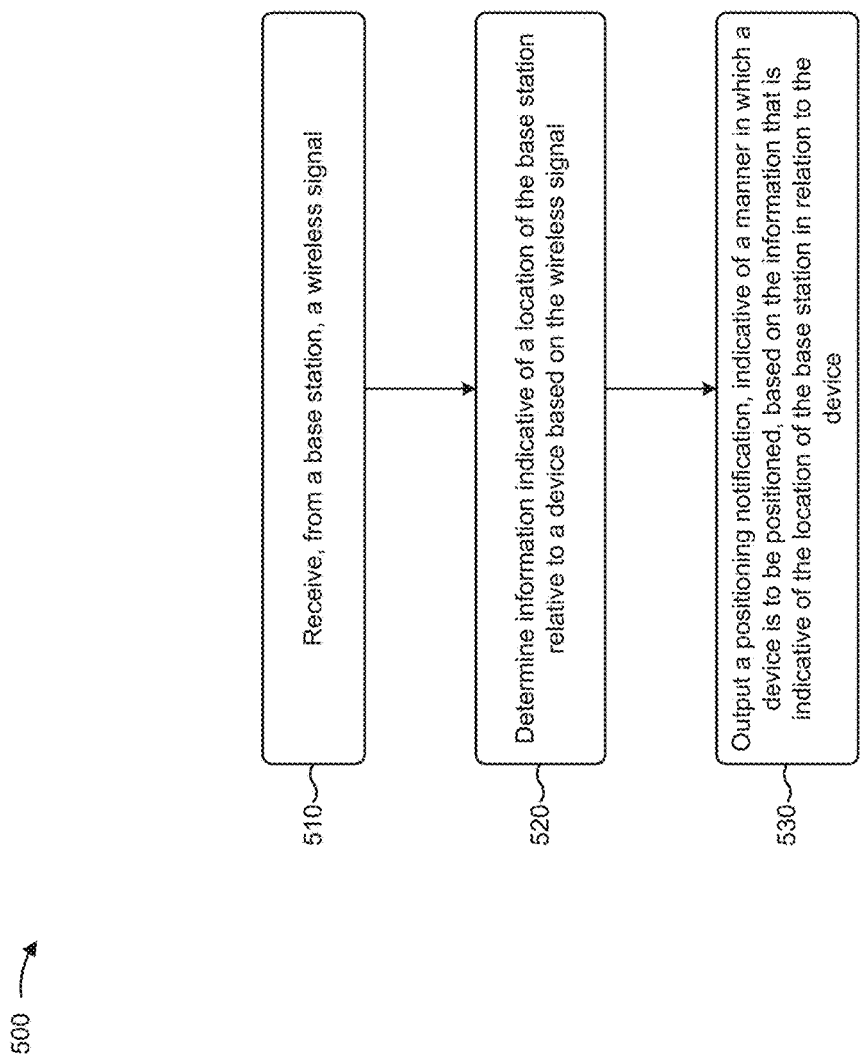
FIG. 5 is a flow chart of an example process for providing a positioning notification based on base station location information.

FIG. 5 is a flow chart of an example process 500 for providing a positioning notification based on base station location information. In some implementations, one or more process blocks of FIG. 5 may be performed by CPE 210. In some implementations, one or more process blocks of FIG. 5 may be performed by another device or a group of devices separate from or including CPE 210, such as base station 220.

As shown in FIG. 5, process 500 may include receiving, from a base station, a wireless signal (block 510), and determining information indicative of a location of the base station relative to a device based on the wireless signal (block 520). For example, CPE 210 may receive, from base station 220, a wireless signal, and may determine information indicative of a location of base station 220 relative to CPE 210 based on the wireless signal. In some implementations, base station location information may refer to information that is indicative of a location of base station 220 in relation to CPE 210. In some implementations, CPE 210 may determine information that identifies a location of base station 220. Additionally, or alternatively, CPE 210 may determine information that identifies a location of base station 220 in relation to CPE 210.

In some implementations, CPE 210 may determine base station location information based on an angle of arrival measurement. For example, CPE 210 may receive a wireless signal using a phased array antenna, and may determine an angle of arrival based on the wireless signal and/or a signal quality value. In some implementations, CPE 210 may determine an angle of arrival based on phase measurements associated with wireless signals. For example, based on differences in propagation distances from base station 220 to particular antenna elements associated with a phased array antenna, particular antenna elements may measure different phases associated with the wireless signal.

Additionally, CPE 210 may determine an angle of arrival based on the phase differences, distances between the antenna elements, and/or a wavelength of the wireless signal (e.g., using an angle of arrival estimation algorithm). Additionally, or alternatively, CPE 210 may determine an angle of arrival using different antennas (e.g., may determine an angle of arrival for each antenna), and may determine an overall angle of arrival by performing a mathematical operation using the respective angles of arrival (e.g., by determining a mean or median of the angle of arrival values, by selecting one of the angle of arrival values, by multiplying one of the angle of arrival values by a weight value, or the like).

In some implementations, CPE 210 may determine an angle of arrival based on signal quality value measurements associated with a wireless signal. For example, CPE 210 may determine an angle of arrival using another algorithm based on signal quality values measured by different antenna elements and/or antennas (e.g., RSRP values, RSSI values, path loss values, or the like). Additionally, or alternatively, CPE 210 may determine base station location information based on implementing another technique (e.g., triangulation, multilateration, geolocation, or trilateration).

In some implementations, CPE 210 may determine an angle or arrival value based on an antenna element pair. Additionally, or alternatively, CPE 210 may determine an overall angle or arrival value based on performing a mathematical operation using respective angles of arrival associated with particular antenna element pairs. For example, CPE 210 may determine an angle of arrival value based on the following equation:

$$\text{Angle of arrival} = \arccos((a_1^2 - a_2^2 - x_{12}^2)/(2a_1 \times x_{12}))$$

As shown in the above equation, CPE 210 may determine an angle of arrival based on an inverse cosine function, a first value measured by a first antenna element (e.g., "$a_1$"=a signal quality value, a path loss value, or the like), a second value measured by a second antenna element (e.g., "$a_2$"), and a distance between the first antenna element and the second antenna element (e.g., "$x_{12}$"). Additionally, or alternatively, CPE 210 may determine an overall angle of arrival based on the following equation:

$$\text{Overall angle of arrival} = \text{Average}(AOA_1 + AOA_2 \ldots + AOA_n)$$

As shown in the above equation, and as an example, CPE 210 may determine an overall angle of arrival value based on performing a mathematical operation (e.g., averaging) using multiple angle of arrival values (e.g., $AOA_1$, $AOA_2$, ... $AOA_n$). As an example, CPE 210 may determine n angle of arrival values (e.g., using particular antenna element pairs, particular combinations of antenna element pairs, or the like), and may determine an overall angle of arrival value based on the n angle of arrival values. As an example, CPE 210 may include m antenna elements, and may include n antenna pairs (e.g., including various combinations of the m antenna elements). Further, CPE 210 may determine n angle of arrival values based on the n antenna pairs. Alternatively, CPE 210 may determine another quantity of angle of arrival values (e.g., using a subset of the antenna element pairs, or the like).

As further shown in FIG. 5, process 500 may include outputting a positioning notification based on the information that is indicative of the location of the base station in relation to the device (block 530). For example, CPE 210 may provide a positioning notification (e.g., via an output component) based on the base station location information. In some implementations, the positioning notification may include information indicative of a manner in which CPE 210 is to be positioned. For example, CPE 210 may output a positioning notification that identifies a location at which to place CPE 210, a position at which to orient CPE 210, and/or a direction in which to move CPE 210.

In some implementations, CPE 210 may provide a visual positioning notification (e.g., via a display screen, via a set of LEDs, or the like). For example, CPE 210 may provide a visual indicator based on the base station location information (e.g., a visual indicator that points in a direction of base station 220, a visual indicator that identifies a direction in which to orient and/or move CPE 210, or the like). As an example, CPE 210 may provide the visual indicator based on the base station location information, and may update the visual indicator as CPE 210 changes position. In this way, CPE 210 may provide a visual positioning notification that may enable a user to determine particular positions that may provide particular viability as positions at which to place and/or orient CPE 210 (e.g., to improve RF link quality, minimize path loss, or the like).

In some implementations, CPE 210 may provide positioning notifications based on signal quality values, as described in connection with FIG. 4, concurrently with positioning notifications based on base station location information. For example, assume that CPE 210 is associated with a first position. Further, assume that CPE 210 determines a first signal quality value associated with the first position and determines base station location information based on the first position. In this case, CPE 210 may provide a positioning notification based on the base station location information. For example, CPE 210 may provide a visual indicator that indicates a direction of base station 220, and/or a direction of a location where signal reception may improve. Additionally, CPE 210 may provide a positioning notification (e.g., an audible positioning notification) based on the first signal quality value (e.g., a sequence of beeps that occur at a first temporal frequency). Assume that a user moves CPE 210 to a second position based on the base station location information (e.g., in a direction dictated by the visual indicator). In this case, CPE 210 may determine a second signal quality value in association with the second position, and may provide another positioning notification (e.g., another audible positioning notification) based on the second signal quality value (e.g., at a second temporal frequency that is greater than the first temporal frequency), which indicates that the second signal quality value is greater than the first signal quality value.

In some implementations, CPE 210 may determine that a signal quality value satisfies a threshold, and may provide a positioning notification based on the signal quality satisfying the threshold. For example, assume that CPE 210 determines that the signal quality value satisfies the threshold when CPE 210 is associated with a particular position. In this case, CPE 210 may provide a visual positioning notification that indicates that CPE 210 should be oriented and/or located at the particular position.

In this way, CPE 210 may provide positioning notifications based on base station location information and signal quality values, which may enable a user to identify particular positions at which to place and/or orient CPE 210.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
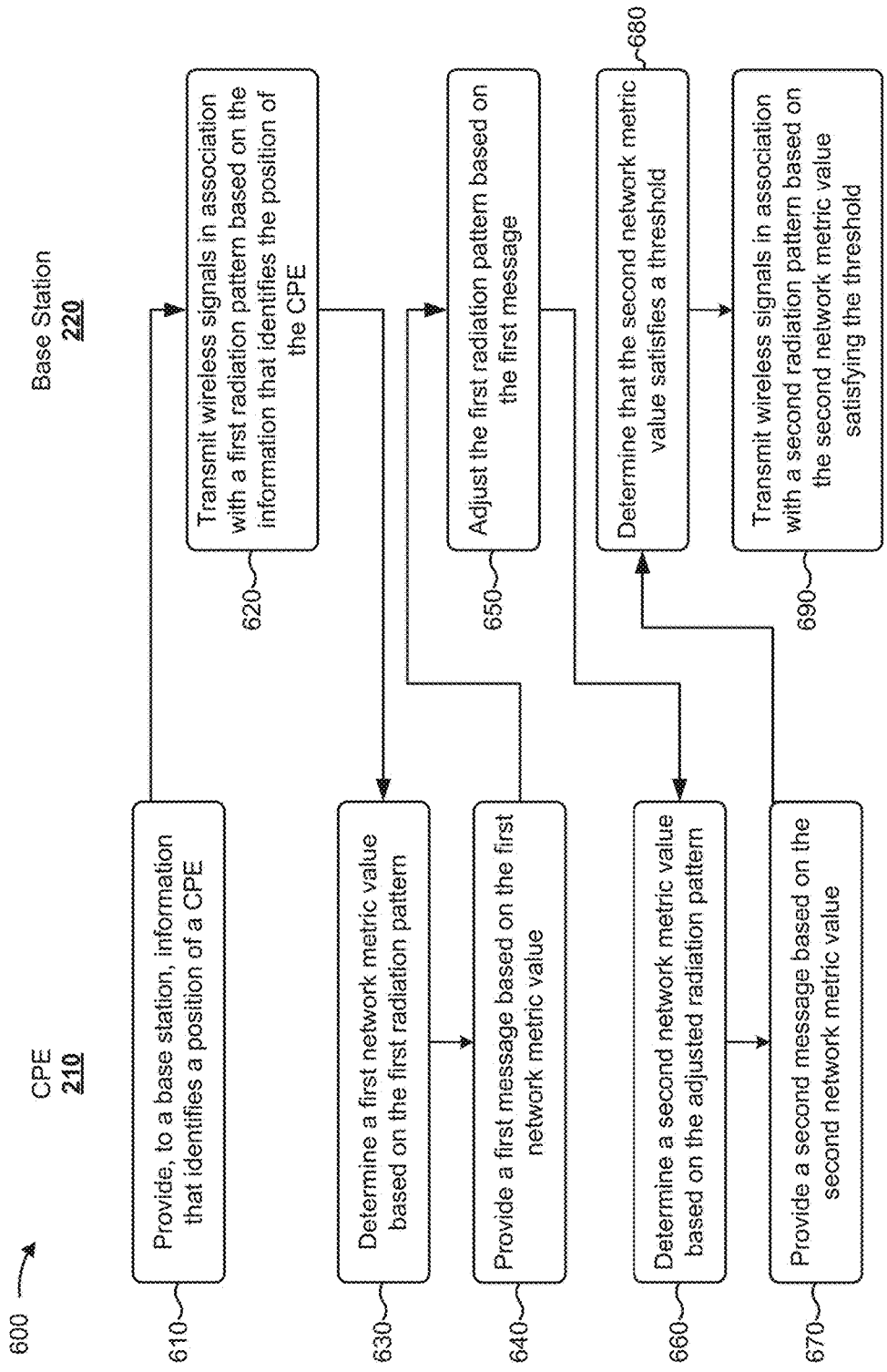
FIG. 6 is a flow chart of an example process for implementing a beamforming technique based on a network metric value.

FIG. 6 is a flow chart of an example process 600 for implementing a beamforming technique based on a network metric value. In some implementations, one or more process blocks of FIG. 6 may be performed by CPE 210 and/or base station 220.

As shown in FIG. 6, process 600 may include providing, to a base station, information that identifies a position of a CPE (block 610). For example, CPE 210 may provide, to base station 220, information that identifies a position of CPE 210. In some implementations, CPE 210 may provide a wireless signal (e.g., a pilot signal) that includes information that identifies the position of CPE 210. For example, the wireless signal may include location information associated with CPE 210 (e.g., may include GPS coordinates, or the like). Additionally, or alternatively, the wireless signal may include a device identifier associated with CPE 210 (e.g., information that identifies CPE 210, such as a string of characters, or the like).

In some implementations, CPE 210 may provide the information that identifies the position of CPE 210 based on an input (e.g., received from a user associated with CPE 210). Additionally, or alternatively, CPE 210 may provide the information that identifies the position of CPE 210 based on a signal quality value satisfying a threshold. For example, CPE 210 may determine that a signal quality value satisfies a threshold, and may provide the information that identifies the location of CPE 210 based on the signal quality value satisfying the threshold. Additionally, or alternatively, CPE 210 may determine that CPE 210 is associated with a particular position for a threshold amount of time (e.g., has remained in a static position), and may provide the information that identifies the position of CPE 210 based on the threshold amount of time elapsing. Additionally, or alternatively, CPE 210 may provide the information the information that identifies the position of CPE 210 based on a request from base station 220. In this way, CPE 210 may provide information that identifies a position of CPE 210, such as a position that is associated with an improved signal quality, thereby enabling base station 220 to and CPE 210 to establish a data connection.

As further shown in FIG. 6, process 600 may include transmitting wireless signals in association with a first radiation pattern based on the information that identifies the position of the CPE (block 620). For example, base station 220 may provide wireless signals to CPE 210 in association with a first radiation pattern based on the information that identifies the position of CPE 210.

In some implementations, a radiation pattern may refer to a directional dependence of the strength of wireless signals being provided via an antenna of base station 220. In some implementations, base station 220 may provide wireless signals to CPE via a phased array antenna. Additionally, base station 220 may perform a technique (e.g., a beamforming, a beam steering, and/or a beam tilting technique) to provide wireless signals to CPE 210 in association with a particular radiation pattern and/or to adjust a particular radiation pattern. In some implementations, the wireless signals may be associated with a particular frequency (e.g., an ultra high frequency, a super high frequency, an extremely high frequency, or the like). Additionally, or alternatively, the wireless signals may be associated with particular wavelengths (e.g., 10 cm, 10 mm, 1 mm, etc.). For example, base station 220 may provide wireless signals to CPE 210 using a particular frequency or range of frequencies (e.g., 3-300 GHz).

In some implementations, the first radiation pattern may include one or more lobes. For example, the first radiation pattern may include a main lobe (e.g., a main beam), such as the lobe that is associated with a maximum power (e.g., radiated signal strength). Additionally, or alternatively, the main lobe may be associated with a first beamwidth (e.g., a width of the main lobe as defined by an azimuth angle, such as five degrees, ten degrees, or the like).

In some implementations, base station 220 may perform a technique to provide wireless signals to CPE 210 such that the main lobe, associated with the first radiation pattern, is directed towards CPE 210. In some implementations, base station 220 may store information that correlates a location of CPE 210 and the device identifier of CPE 210 (e.g., in a data structure). Additionally, or alternatively, base station 220 may store information that correlates information associated with a technique and the device identifier of CPE 210. For example, base station 220 may store information associated with performing a technique (e.g., information that identifies parameter values, such as amplitude values, phase values, weighting values, time-delay values, or the like, of signals to be provided to respective antenna elements of base station 220 to perform a beam forming technique). In this way, base station 220 may provide wireless signals to CPE 210 based on the stored information.

In this way, base station 220 may provide wireless signals to CPE 210, and may direct a main lobe towards CPE 210 based on the information that identifies the position of CPE 210. Additionally, in this way, base station 220 may reduce RF environment issues (e.g., path loss, penetration loss, or the like) based on directing the main lobe towards CPE 210.

As further shown in FIG. 6, process 600 may include determining a first network metric value based on the first radiation pattern (block 630), and providing a first message based on the first network metric value (block 640). For example, CPE 210 may receive wireless signals provided via base station 220, may determine a first network metric value, and may provide a first message based on the first network metric value. In some implementations, the first network metric value may include a bandwidth value, a throughput value, a goodput value, or the like. Additionally, or alternatively, the first network metric value may be associated with another network metric (e.g., jitter, latency, packet loss, delay, or the like).

In some implementations, CPE 210 may receive wireless signals from base station 220, and base station 220 and CPE 210 may establish a data connection. For example, base station 220 may direct a main lobe towards CPE 210, and CPE 210 may receive wireless signals associated with the main lobe. Additionally, or alternatively, CPE 210 may establish a data connection with base station 220 based on receiving the wireless signals. Additionally, or alternatively, base station 220 may provide data signals to CPE 210 based on the data connection, and CPE 210 may determine the first network metric value based on the data connection (e.g., data signals).

In some implementations, CPE 210 may provide, to base station 220, a first message that identifies the first network metric value. In some implementations, the first message may include information that identifies the first network metric value (e.g., a bandwidth value). In this way, CPE 210 may provide information that identifies network metric values, which may enable base station 220 to perform a technique to improve network metric values associated with CPE 210, thereby conserving processor and/or memory resources of CPE 210 and/or base station 220 and/or network resources.

As further shown in FIG. 6, process 600 may include adjusting the first radiation pattern based on the first message (block 650). For example, base station 220 may receive the first message, and may perform a technique to adjust the first radiation pattern based on the first message. In some implementations, base station 220 may adjust the first radiation pattern by adjusting a direction of the main lobe associated with an azimuth plane (e.g., an x-y plane, or a different plane). For example, base station 220 may perform a beam steering technique to adjust a direction of the main lobe of the first radiation pattern. As an example, base station 220 may adjust parameter values (e.g., phase values, amplitude values, or the like) of signals being provided to various antenna elements of a phased array antenna of base station 220 to perform a beam steering technique. Additionally, or alternatively, base station 220 may perform a beam tilting technique to adjust a direction associated with the main lobe in a vertical plane (e.g., a plane that is orthogonal to the azimuth plane, such as a y-z plane, or another plane).

In some implementations, base station 220 may identify the first network metric value based on the first message, and may compare the first network metric value and stored information (e.g., stored information that identifies network metric values, such as ranges of network metric values, thresholds, or the like). Additionally, or alternatively, base station 220 may determine that the first network metric value is associated with a particular range of network metric values, satisfies a threshold, or the like. Additionally, or alternatively, base station 220 may adjust the first radiation pattern based on comparing the first network metric value and the stored information. In this way, base station 220 may perform a technique that may improve network metric values associated with data signals that are to be provided to CPE 210.

As further shown in FIG. 6, process 600 may include determining a second network metric value based on the adjusted radiation pattern (block 660), and providing a second message based on the second network metric value (block 670). For example, CPE 210 may receive data signals associated with the second radiation pattern, and may determine a second network metric value. Additionally, CPE 210 may provide, to base station 220, a second message that identifies the second network metric value. In some implementations, CPE 210 may determine the second network metric value in a similar manner as described above in connection with block 615. For example, CPE may receive data signals from base station 220, and may determine the second network metric value based on the data signals (e.g., based on a data connection).

As further shown in FIG. 6, process 600 may include determining that the second network metric value satisfies a threshold (block 680). For example, base station 220 may receive the second message, may identify the second network metric value, and may determine that the second network metric value satisfies a threshold. In some implementations, base station 220 may determine that the second network metric value satisfies the threshold based on stored information. For example, base station 220 may compare the second network metric value and a threshold (e.g., a maximum network metric value, or the like), and may determine that the second network metric value satisfies the threshold based on the comparison. Additionally, or alternatively, base station 220 may determine that the second network value satisfies the threshold based on receiving, from CPE 210, information that indicates that the second network metric value satisfies the threshold. For example, CPE 210 may compare the second signal quality value with stored information, and may determine that the second signal quality value satisfies the threshold. Additionally, CPE 210 may provide, to base station 220, information that identifies that the second network metric value satisfies the threshold.

In this way, base station 220 may determine that a main lobe associated with a radiation pattern is directed towards CPE 210, such that CPE 210 is receiving data signals in an improved manner (e.g., at a particular throughput value, or the like).

As further shown in FIG. 6, process 600 may include transmitting wireless signals in association with a second radiation pattern based on the second network metric value satisfying the threshold (block 690). For example, base station 220 may provide, to CPE 210, wireless signals in association with a second radiation pattern. In some implementations, the second radiation pattern may be associated with a main lobe that includes a second beamwidth that is different than the first beamwidth. For example, base station 220 may perform a beamforming technique, and may narrow a main lobe associated with the first radiation pattern (e.g., to generate a second radiation pattern). As an example, an azimuth angle of the main lobe associated with the second radiation pattern may be less than an azimuth angle of the main lobe associated with the first radiation pattern. In some implementations, base station 220 may store information that identifies parameter values associated with a technique (e.g., phase values, or the like, to be used when implementing a beamforming technique) to generate the second radiation pattern when providing data signals to CPE 210. For example, base station 220 may correlate the parameter values with the device identifier of CPE 210.

In this way, base station 220 may direct wireless signals to CPE 210 using a narrow beam, thereby increasing antenna gain, improving link performance, mitigating RF environment issues, etc. Furthermore, base station 220 may conserve processor and/or memory resources and/or network resources by reducing communication issues (e.g., low data throughput, radio link failure, radio resource control drop, etc.).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In some implementations, processes 400, 500, 600, and/or some combination thereof may be performed independently. Alternatively, processes 400, 500, 600 and/or some combination thereof may be performed dependently and/or in parallel.

Implementations described herein enable a CPE to determine signal quality values, and provide positioning notifications (e.g., visual and/or audible positioning notifications) based on the signal quality values. In this way, a user may identify a particular location and/or orientation of CPE, in association with the user's premises, at which the CPE is receiving wireless signals from a base station in an improved manner (e.g., minimizing path loss, minimizing penetration loss, or the like). In this way, a user may install a CPE without the aid of a network operator.

Additionally, implementations described herein enable a base station to perform techniques (e.g., beamforming and/or beam steering techniques) based on feedback received from the CPE in association with a data connection. For example, the base station may direct a main lobe of a radiation pattern towards the CPE, such that the CPE is receiving an improved signal, thereby increasing bandwidth, throughput, or the like. In this way, the base station and/or the CPE may conserve processor and/or memory resources (e.g., by reducing communication issues, such as low throughput, radio link failure, etc.). Additionally, network resources may be conserved.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a base station and from a customer premises equipment, information that identifies a position of the customer premises equipment;
   providing, by the base station and to the customer premises equipment, first wireless signals in association with a first radiation pattern;
   receiving, by the base station, first information associated with a first network metric value,
      the customer premises equipment to determine the first network metric value based on the first wireless signals;
   adjusting, by the base station and based on the first network metric value, a direction of a lobe of the first radiation pattern;
   receiving, by the base station and based on adjusting the direction of the lobe of the first radiation pattern, second information associated with a second network metric value;
   determining, by the base station, that the second network metric value satisfies a threshold;
   providing, by the base station and based on the second network metric value satisfying the threshold, second wireless signals in association with a second radiation pattern; and
   narrowing, by the base station, a lobe of the second radiation pattern.

2. The method of claim 1, where the first radiation pattern includes a first beamwidth and the second radiation pattern includes a second beamwidth that is different than the first beamwidth.

3. The method of claim 1, further comprising:
   providing, to the customer premises equipment, a reference signal,
      the customer premises equipment to:
         determine, based on the reference signal, at least one of:
            a signal quality value associated with the first wireless signals in association with the first radiation pattern or the second wireless signals in association with the second radiation pattern, or
            information indicative of a location of the base station relative to the customer premises equipment; and
         output a positioning notification, indicative of a manner in which the customer premises equipment is to be positioned, based on at least one of the signal quality value or the information indicative to the location of the customer premises equipment.

4. The method of claim 1, where the threshold is a first threshold; and where the method further comprises:
receiving, from the customer premises equipment, information that identifies that the first network metric value satisfies a second threshold; and where providing the second wireless signals in association with the second radiation pattern comprises:
providing the second wireless signals in association with the second radiation pattern based on the first network metric value satisfying the second threshold.

5. The method of claim 1, further comprising:
receiving third information associated with a third network metric value;
performing a beam steering technique based on the third network metric value; and
where providing the second wireless signals in association with the second radiation pattern comprises:
providing the second wireless signals in association with the second radiation pattern based on performing the beam steering technique.

6. The method of claim 1, where the first wireless signals in association with the first radiation pattern or the second wireless signals in association with the second radiation pattern are associated with at least one of:
an ultra high frequency;
a super high frequency; or
an extremely high frequency.

7. A device, comprising:
a memory; and
one or more processors to:
receive, from a customer premises equipment, information that identifies a position of the customer premises equipment;
provide, to the customer premises equipment, first wireless signals in association with a first radiation pattern;
receive first information associated with a first network metric value,
the customer premises equipment to determine the first network metric value based on the first wireless signals;
adjust, based on the first network metric value, a direction of a lobe of the first radiation pattern;
receive, based on adjusting the direction of the lobe of the first radiation pattern, second information associated with a second network metric value;
determine that the second network metric value satisfies a threshold;
provide, based on the second network metric value satisfying the threshold, second wireless signals in association with a second radiation pattern; and
narrow a lobe of the second radiation pattern.

8. The device of claim 7, where the first radiation pattern includes a first beamwidth and the second radiation pattern includes a second beamwidth that is different than the first beamwidth.

9. The device of claim 7, where the one or more processors are further to:
provide, to the customer premises equipment, a reference signal,
the customer premises equipment to:

determine, based on the reference signal, at least one of:
a signal quality value associated with the first wireless signals in association with the first radiation pattern or the second wireless signals in association with the second radiation pattern, or
information indicative of a location of the device relative to the customer premises equipment; and
output a positioning notification, indicative of a manner in which the customer premises equipment is to be positioned, based on at least one of the signal quality value or the information indicative to the location of the customer premises equipment.

10. The device of claim 7, where the threshold is a first threshold;
where the one or more processors are further to:
receive, from the customer premises equipment, information that identifies that the first network metric value satisfies a second threshold; and
where the one or more processors, when providing the second wireless signals in association with the second radiation pattern, are to:
provide the second wireless signals in association with the second radiation pattern based on the first network metric value satisfying the second threshold.

11. The device of claim 7, where the one or more processors are further to:
receive third information associated with a third network metric value;
perform a beam steering technique based on the third network metric value; and
where the one or more processors, when providing the second wireless signals in association with the second radiation pattern, are to:
provide the second wireless signals in association with the second radiation pattern based on performing the beam steering technique.

12. The device of claim 7, where the first wireless signals in association with the first radiation pattern or the second wireless signals in association with the second radiation pattern are associated with at least one of:
an ultra high frequency;
a super high frequency; or
an extremely high frequency.

13. A non-transitory computer-readable medium storing instructions, the instructions comprising:
one or more instructions that, when executed by one or more processors of a device, cause the one or more processors to:
receive, from a customer premises equipment, first information that identifies a position of the customer premises equipment;
provide, to the customer premises equipment, first wireless signals in association with a first radiation pattern;
receive first information associated with a first network metric value,
the customer premises equipment to determine the first network metric value based on the first wireless signals;
adjust, based on the first network metric value, a direction of a lobe of the first radiation pattern;

receive, based on adjusting the direction of the lobe of the first radiation pattern, second information associated with a second network metric value;

determine that the second network metric value satisfies a threshold;

provide, based on the second network metric value satisfying the threshold, second wireless signals in association with a second radiation pattern; and narrow a lobe of the second radiation pattern.

14. The non-transitory computer-readable medium of claim 13, where the first radiation pattern includes a first beamwidth and the second radiation pattern includes a second beamwidth that is different than the first beamwidth.

15. The non-transitory computer-readable medium of claim 13, where the one or more instructions, when executed by the one or more processors, further cause the one or more processors to:

provide, to the customer premises equipment, a reference signal, the customer premises equipment to:

determine, based on the reference signal, at least one of:

a signal quality value associated with the first wireless signals in association with the first radiation pattern or the second wireless signals in association with the second radiation pattern, or information indicative of a location of the device relative to the customer premises equipment; and output a positioning notification, indicative of a manner in which the customer premises equipment is to be positioned, based on at least one of the signal quality value or the information indicative to the location of the customer premises equipment.

16. The non-transitory computer-readable medium of claim 13, where the threshold is a first threshold;

where the one or more instructions, when executed by the one or more processors, further cause the one or more processors to:

receive, from the customer premises equipment, information that identifies that the first network metric value satisfies a second threshold; and where the one or more instructions, that cause the one or more processors to provide the second wireless signals in association with the second radiation pattern, cause the one or more processors to:

provide the second wireless signals in association with the second radiation pattern based on the first network metric value satisfying the second threshold.

17. The non-transitory computer-readable medium of claim 13, where the one or more instructions, when executed by the one or more processors, further cause the one or more processors to:

receive third information associated with a third network metric value;

perform a beam steering technique based on the third network metric value; and where the one or more instructions, that cause the one or more processors to provide the second wireless signals in association with the second radiation pattern, cause the one or more processors to:

provide the second wireless signals in association with the second radiation pattern based on performing the beam steering technique.

18. The non-transitory computer-readable medium of claim 13, where the first wireless signals in association with the first radiation pattern or the second wireless signals in association with the second radiation pattern are associated with at least one of:

an ultra high frequency;

a super high frequency; or an extremely high frequency.

19. The method of claim 1, where the first network metric value is determined based on at least one of:

a bandwidth value, a throughput value, or a goodput value.

20. The device of claim 7, where the first network metric value is determined based on at least one of:

a bandwidth value, a throughput value, or a goodput value.

* * * * *